United States Patent
Moon

(10) Patent No.: US 6,567,137 B1
(45) Date of Patent: May 20, 2003

(54) AUXILIARY LIGHT SOURCE UNIT FOR REFLECTIVE LIQUID CRYSTAL DISPLAY

(75) Inventor: Jeong Min Moon, Kyonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 83 days.

(21) Appl. No.: 09/692,105

(22) Filed: Oct. 20, 2000

(30) Foreign Application Priority Data

Apr. 14, 1999 (KR) .......................................... 1999-13184

(51) Int. Cl.$^7$ .............................................. G02F 1/1335
(52) U.S. Cl. ............................. 349/61; 349/63; 361/681
(58) Field of Search .............................. 349/63, 65, 62; 362/31, 191, 85, 562; 361/681

(56) References Cited

U.S. PATENT DOCUMENTS

| | | | | |
|---|---|---|---|---|
| 3,881,807 A | * | 5/1975 | Hosokawa et al. | 350/160 |
| 4,561,044 A | * | 12/1985 | Ogura et al. | 315/169.3 |
| 5,379,201 A | * | 1/1995 | Friedman | 362/191 |
| 5,477,239 A | * | 12/1995 | Busch et al. | 345/102 |
| 5,615,945 A | * | 4/1997 | Tseng | 362/226 |
| 5,803,572 A | * | 9/1998 | Brada | 362/109 |
| 5,822,546 A | * | 10/1998 | George | 395/281 |
| 5,868,487 A | * | 2/1999 | Polley et al. | 362/109 |
| 6,049,410 A | * | 4/2000 | Nakagaki et al. | 359/253 |
| 6,262,884 B1 | * | 7/2001 | Hwang et al. | 312/223.6 |
| 6,330,386 B1 | * | 12/2001 | Wagner et al. | 385/120 |
| 6,367,946 B1 | * | 4/2002 | Leifer et al. | 362/109 |
| 6,380,921 B2 | * | 4/2002 | Nakamura | 345/102 |
| 6,386,724 B2 | * | 5/2002 | Naghi | 345/905 |

* cited by examiner

Primary Examiner—Kenneth Parker
(74) Attorney, Agent, or Firm—McKenna Long & Aldridge LLP

(57) ABSTRACT

An auxiliary light source apparatus for radiating light onto a reflective liquid crystal display is disclosed. In the apparatus, a reflective display module is pivotally installed to a main body. An auxiliary light source is opened and closed from and to the reflective display module to radiate light onto a display area of the reflective display module. Accordingly, the auxiliary light source apparatus uniformly radiates light onto the entire reflective liquid crystal display panel.

16 Claims, 8 Drawing Sheets

AUXILIARY LIGHT SOURCE UNIT FOR REFLECTIVE LIQUID CRYSTAL DISPLAY

This application claims the benefit of Korean Patent Application No. 1999-13184, filed on Apr. 14, 1999, which is hereby incorporated by reference.

BACKGROUND OF THE INVENTION

1. Field of the Invention

The present invention relates to a reflective liquid crystal display, and more particularly to an auxiliary light source unit for radiating light other than natural light onto a reflective liquid crystal display.

2. Discussion of the Related Art

A liquid crystal display (LCD) is a flat panel display device having advantages of small bulk, thin thickness and low power consumption. LCDs have been used in connection with portable computer devices, such as notebook personal computers, office automation equipment and audio/video machinery, etc. LCDs control an electric field applied to a liquid crystal material having a dielectric anisotrophy to transmit or shut off a light, thereby displaying a picture or an image. Unlike display devices that generate light internally, such as an electro-luminescence (EL) device, a cathode ray tube (CRT), a light emitting diode (LED) and so on, LCDs use external light rather than generating light internally.

LCD devices are largely classified into transmissive type devices and reflective type devices, depending on the method of utilizing light. Transmissive type LCDs include a liquid crystal panel having a liquid crystal material injected between two transparent substrates and a backlight unit for supplying light to the liquid crystal panel. However, it is difficult to make a transmissive LCD with thin thickness and light weight. Moreover, backlight units of transmissive LCDs have excessive power consumption.

On the other hand, reflective type LCDs includes a reflective liquid crystal display panel 10 that transmits and reflects natural light and peripheral light to and from the display screen without a backlight. As shown in FIG. 1, reflective liquid crystal panel 10 consists of a liquid crystal panel 2 in which a liquid crystal material is injected between two transparent substrates, and a reflector 4 arranged at the rear side of the liquid crystal panel 2 or arranged at the interior of the liquid crystal panel to reflect a light toward the viewing side. This reflective LCD reflects natural light or peripheral light by means of the reflector 4 to display a picture or an image. However, the reflective LCD has a considerably low brightness level when natural light or peripheral light is not sufficient. An observer cannot view the display image at such low brightness levels. In order to solve this problem, there has been suggested a reflective LCD using an auxiliary light source other than natural light.

FIG. 2 shows a reflective LCD disclosed in U.S. Pat. No. 5,477,239. Referring to FIG. 2, the conventional reflective LCD shown includes a display module 24 attached pivotally to a main body 28. The display module 24 houses a reflective liquid crystal display panel 22, and auxiliary light sources 26a and 26b. Auxiliary light sources 26a and 26b are line light sources at the left and right sides of the reflective liquid crystal display panel 22. Each auxiliary light source 26a and 26b is installed in such a manner to be opened and closed on the display module 24, and to radiate light onto the surface of the reflective liquid crystal display panel 22 to the exterior of the display module 24. A film (not shown) is adhered to an upper glass substrate of the reflective liquid crystal display panel 22. This film includes a number of minute structures for reflecting light received at an inclination angle from the auxiliary light sources 26a and 26b toward the display screen of the reflective liquid crystal display panel 22. Each of the minute structures must have a different inclination angle and height at every position so that a light can be uniformly received at the display screen of the reflective liquid crystal display panel 22. Because of this, there is difficulty in designing and fabricating the minute structures. Because additional area is required for the display module 24 to house the auxiliary light sources 26a and 26b, the effective display area of the liquid crystal display panel 22 is reduced and the display module 24 is enlarged. Moreover, light incidence efficiency is low because of the difference in the quantity of light incident to the reflective liquid crystal display panel 22 at different positions. The quantity of light thus depends on the distance from the auxiliary light sources 26a and 26b to the position on the liquid crystal display panel 22.

FIG. 3 shows a reflective LCD disclosed in U.S. Pat. No. 5,091,873. Referring to FIG. 3, the conventional reflective LCD includes a display module 34 installed pivotally at a main body 38 and mounted with a reflective liquid crystal display panel 32, and a light source 40 mounted releasably on the main body 38. The light source 40 includes a lamp 42 for generating light and a reflector 44 for reflecting light radiated from the lamp 42 toward the reflective liquid crystal display panel 32, thereby radiating light onto the display screen of the liquid crystal display panel 32. However, the main body 28 of the reflective LCD is bulky and the structure is complicated because of the light source 40. Moreover, light incidence efficiency is low because of the difference in the quantity of light incident to the liquid crystal display panel 32. The quantity of light varies with the distance between the reflector 44 and the reflective liquid crystal display panel 32.

As described above, conventional reflective LCDs have the disadvantage that light cannot be uniformly radiated onto the display screen because of the location of the auxiliary light source. Moreover, because of the added weight and size of the auxiliary light source, it is difficult to make a product using a conventional reflective LCD that is light weight and small in dimension.

SUMMARY OF THE INVENTION

Accordingly, the present invention is directed to an auxiliary light source unit for a reflective liquid crystal display (LCD) that substantially obviates one or more of the problems due to limitations and disadvantages of the related art.

An object of the present invention is to provide an auxiliary light unit for a reflective liquid crystal display that is adapted to radiate light uniformly.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an auxiliary light source apparatus for a reflective liquid crystal display according to an embodiment of the present invention includes a main body; a reflective display module connected pivotally to the main body; and an auxiliary light source, the auxiliary light source being opened and closed from and to the reflective display module, for radiating light onto a display area of the reflective display module.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 1:
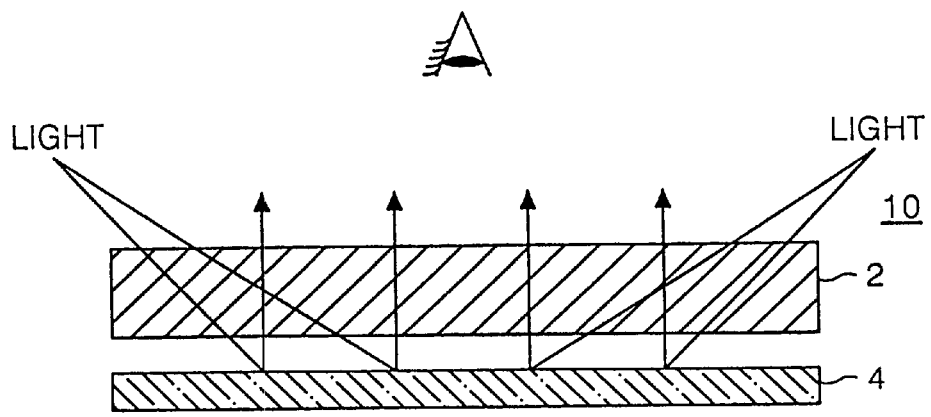
FIG. 1 is a schematic section view showing the structure of a conventional reflective liquid crystal display.
Figure 2:
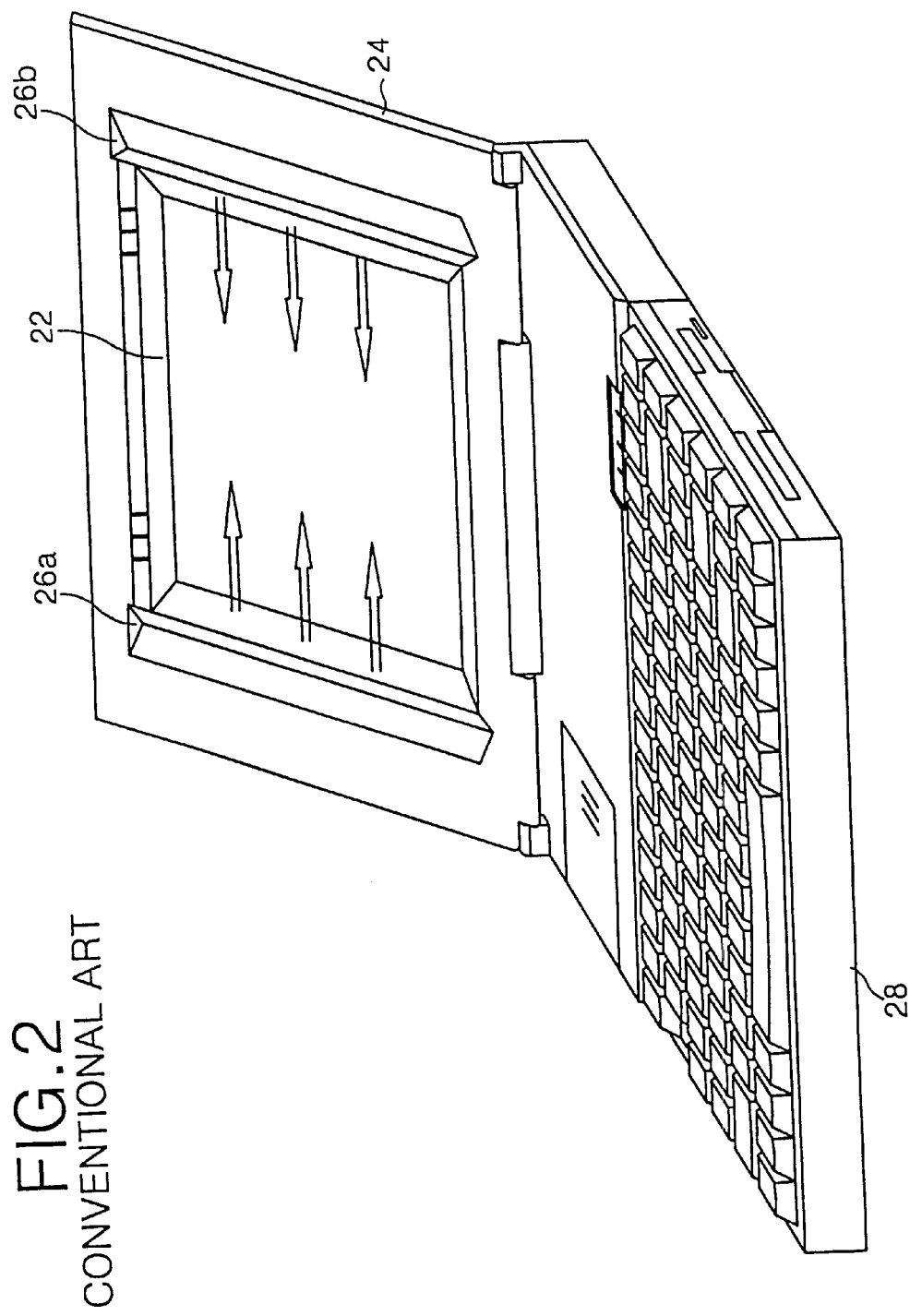
FIG. 2 illustrates a reflective liquid crystal display mounted with a conventional auxiliary light source.
Figure 3:
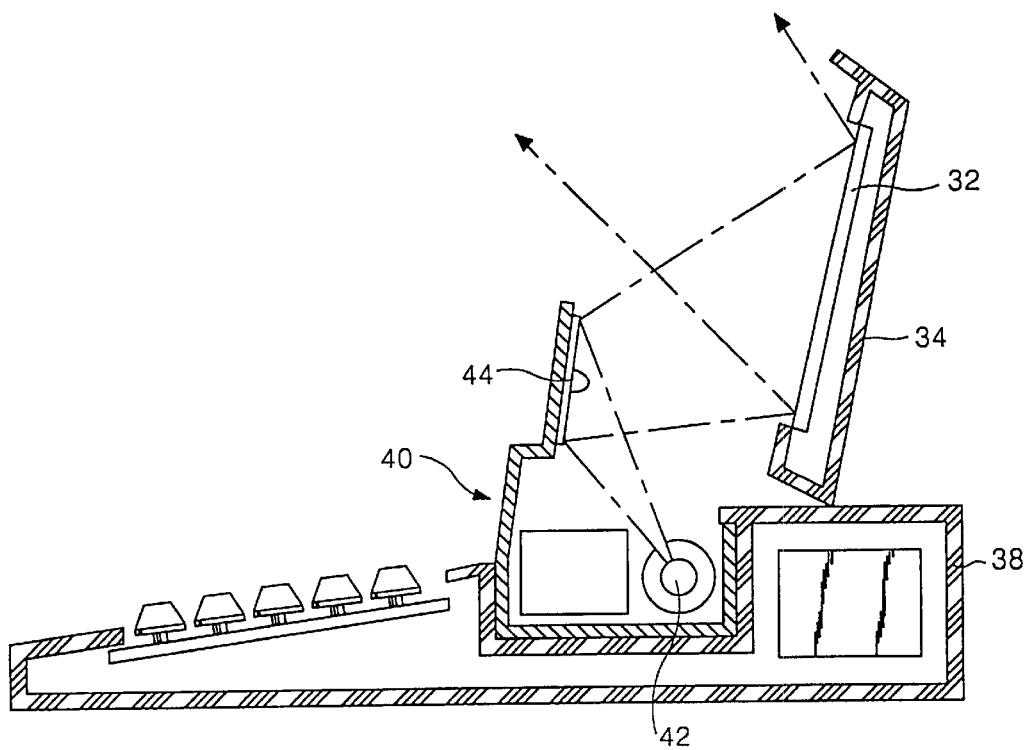
FIG. 3 illustrates a reflective liquid crystal display mounted with another conventional auxiliary light source.
Figure 4:
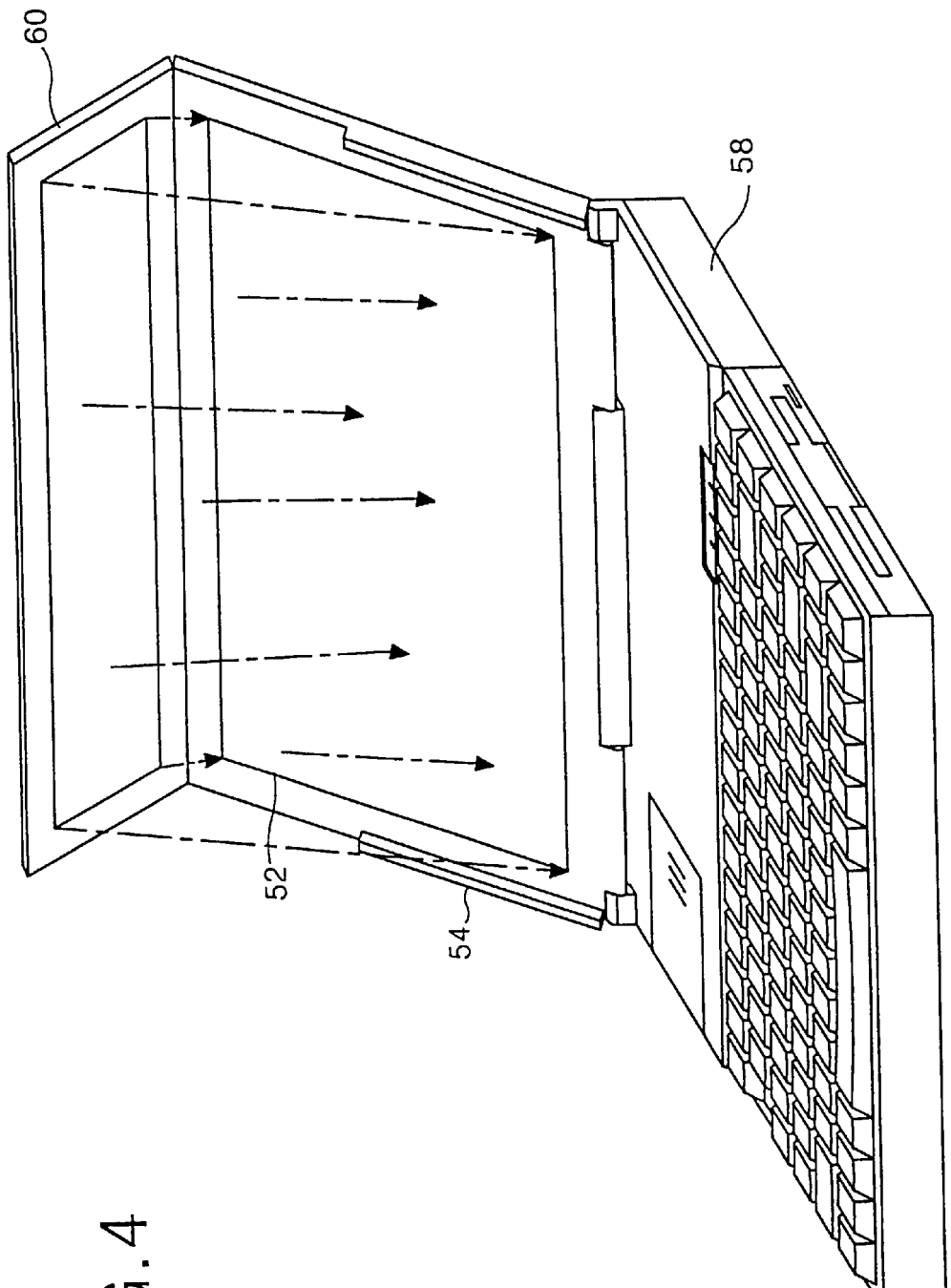
FIG. 4 is a perspective view of a reflective liquid crystal display according to an embodiment of the present invention.

As shown in FIG. 4, a reflective liquid crystal display (LCD) according to an embodiment of the present invention includes a display module 54 pivotally installed to a main body 58 and housing a reflective liquid crystal display panel 52. The reflective LCD also includes an auxiliary light source 60 pivotally connected to the display module 54. The auxiliary light source 60 has the same, or substantially the same, length as the display panel 52. The width of the auxiliary light source 10 is less than the display panel 52. The auxiliary light source 60 is coupled to the upper end of the display module 54 by a hinge structure allowing the auxiliary light source 60 to pivot around a hinge point. Thus, the auxiliary light source 60 can be opened and closed from and to the display module 54. The auxiliary light source 60 radiates light onto an effective display area of the reflective liquid crystal display panel 52. Light outputted from the auxiliary light source 60 within a certain incidence angle range is uniformly applied to the entire effective display area of the reflective liquid crystal display panel 52.

Figure 5:
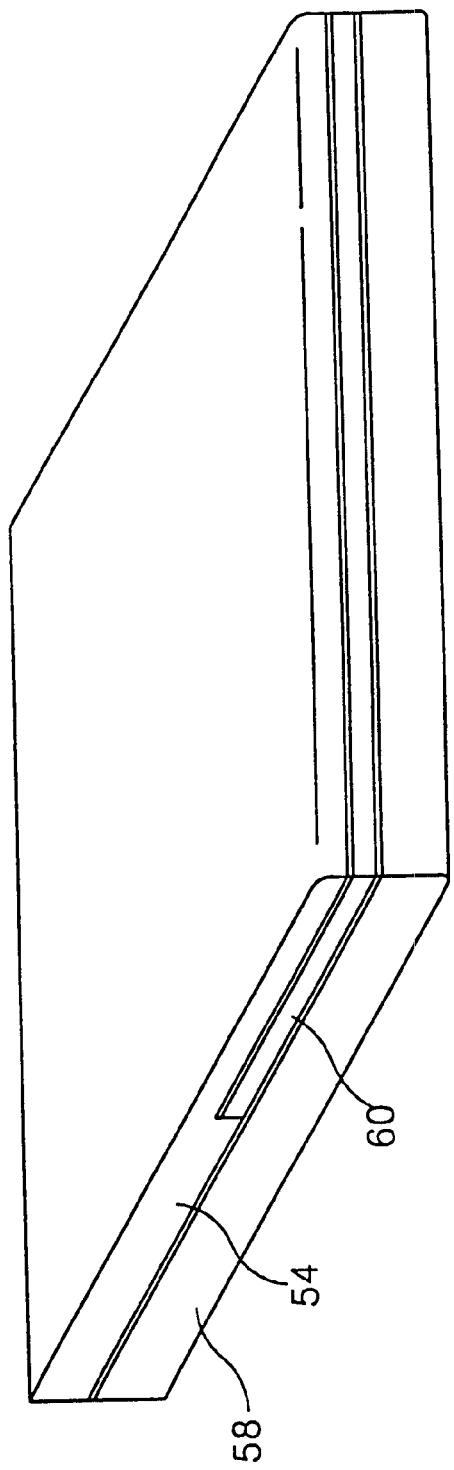
FIG. 5 is a perspective view showing the auxiliary light source of the reflective liquid crystal display in FIG. 4 closed with the display module.

FIG. 5 shows the reflective LCD according to the present invention has been closed. When the reflective LCD is not in use, the auxiliary light source 60 is snapped and folded flush with the display module.

Figure 6:
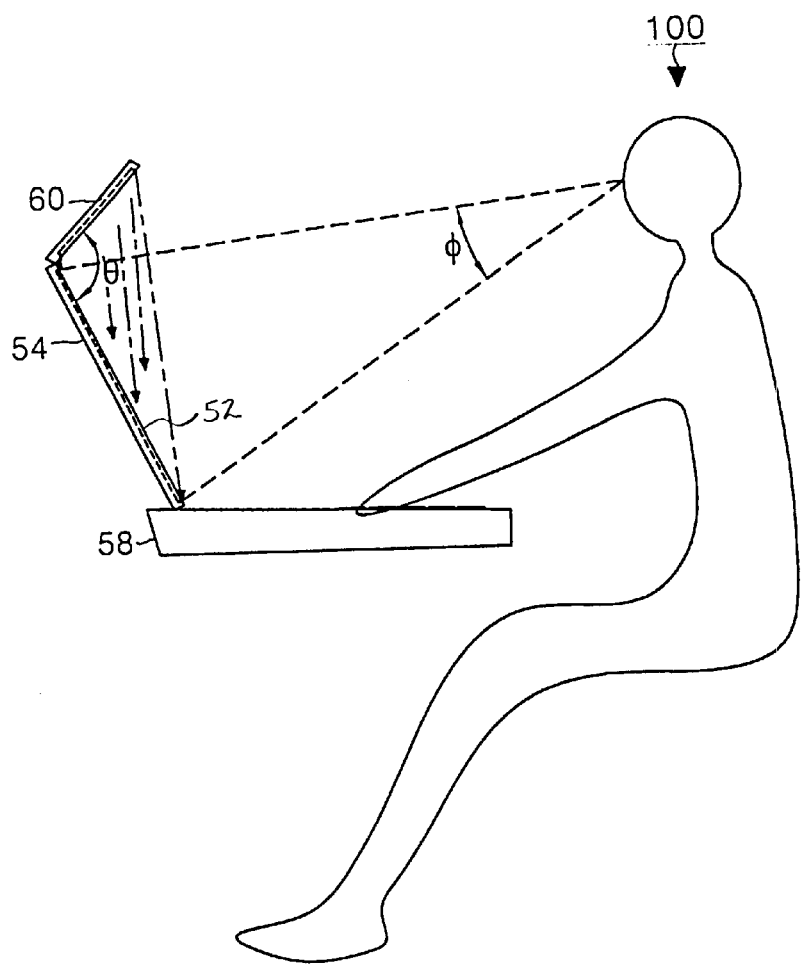
FIG. 6 represents a relationship between the auxiliary light source of the reflective liquid crystal display in FIG. 4 and a viewing range of an observer.

FIG. 6 illustrates the position of the reflective LCD according to the present invention when in use. As shown in FIG. 6, the auxiliary light source 60 is opened by a pivot angle θ from the display module 54. The auxiliary light source 60 is thus positioned to radiate light onto an effective display area of the reflective liquid crystal display panel 52. At this time, the auxiliary light source 60 is positioned above a viewing range φ of the observer 100. The angle φ is the angle at which the observer 100 views the effective display area of the reflective liquid crystal display panel 52.

Figure 7:
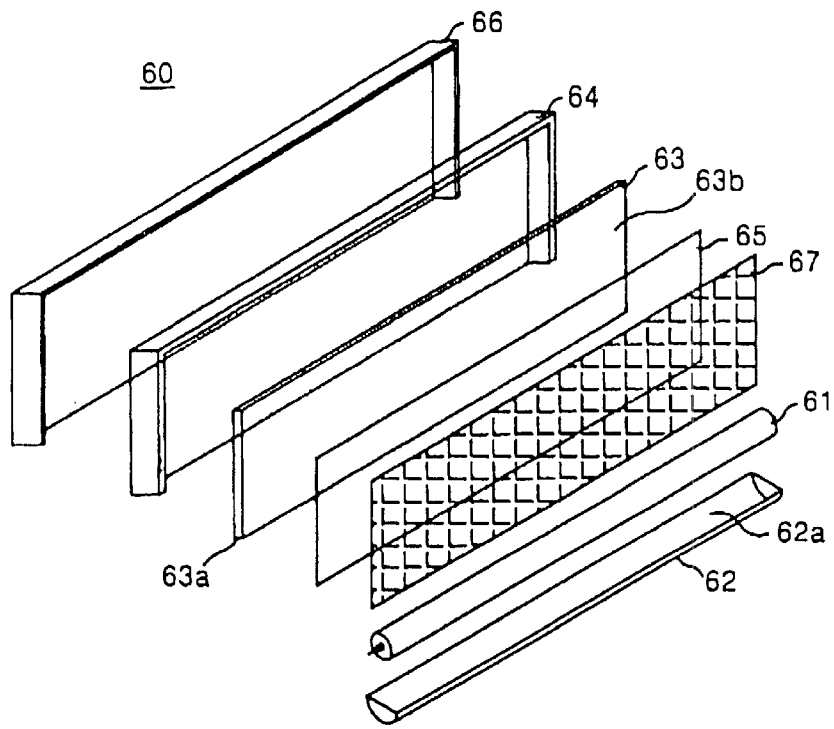
FIG. 7 is an exploded perspective view showing the detailed configuration of the auxiliary light source in FIG. 4.

As shown in FIG. 7, the auxiliary light source 60 includes a lamp 61, a lamp reflector 62, a light guide plate 63, a flat reflector 64, a light path changer 65, a diffuser 67, and a cover 66. The lamp 61 is installed between a reflective surface 62a of the lamp reflector 62 and an incidence surface 63a of the light guide plate 63. The lamp reflector 62 reflects light generated by the lamp 61 toward the incidence surface 63a of the light guide plate 63 to converge light onto the incidence surface 63a. The light guide plate 63 is arranged adjacent to the lamp 61, the flat reflector 64 and the light path changer 65. The incidence surface 63a of the light guide plate 63 is adjacent to the lamp 61. The flat reflector 64 abuts the side surface, the rear surface, and the output surface 63b of the light guide plate 63, the rear surface being opposite the incidence surface 63a. The output surface 63b of the light guide plate 63 is adjacent to the light path changer 65. The light guide plate 63 emits light received via the incidence surface 63a through the output surface 63b to output light received as a line light source into a plane light source. A detailed structure of the light guide plate 63 will be described later. The flat reflector 64 reflects light outputted to the side surface, the rear surface, and the output surface 63b of the light guide plate 63 toward the output surface 63b to improve the light efficiency. The function of the flat reflector 64 may be performed by an inner side surface of the cover 66. Thus, the flat reflector 64 may be removed from the auxiliary light source 60. The light path changer 65 changes the output angle of light emitted from the light guide plate 63 to direct the light toward the effective display area of the reflective liquid crystal display panel 52. The light emitted from the light guide plate 63 thus can be converged onto the effective display area of the reflective liquid crystal display panel 52. Sufficient convergance of the light emitted from the light guide plate 63 onto the effective display area of the reflective liquid crystal display panel 52 allows removal of the light path changer 65 from the auxiliary light source 60. The diffuser 67 is installed adjacent to the light path changer 65 to disperse light received from the light path changer 65, thus allowing light incident to the effective display area of the reflective liquid crystal display panel 52 to have an even distribution.

The cover 66 encloses the lamp 61, the lamp reflector 62, the light guide plate 63, the flat reflector 64 and the light path changer 65, the lower end of which is coupled with the upper end of the display module 54 by means of a hinge structure.

Figure 8:
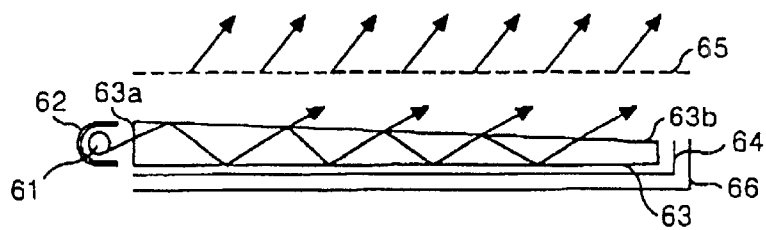
FIG. 8 is a section view showing a light path of the auxiliary light source in FIG. 4.

As shown in FIG. 8, light generated from the lamp 61 of the auxiliary light source 60 is incident to the light guide plate 63 via the incidence surface 63a with the aid of the lamp reflector 62. Thereafter, the light is emitted through the output surface 63b with the aid of the flat reflector 64. The angle of light emitted by the output surface 63b is adjusted by the light path changer 65 to be directed toward the reflective liquid crystal display panel 52.

Figure 9A:
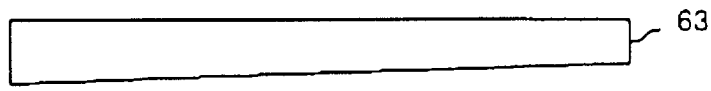
FIG. 9A to FIG. 9D are section views showing embodiments of the light guide plate in FIG. 7.
Figure 9B:
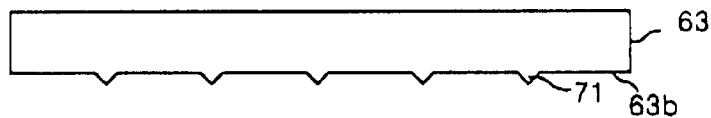
Figure 9C:
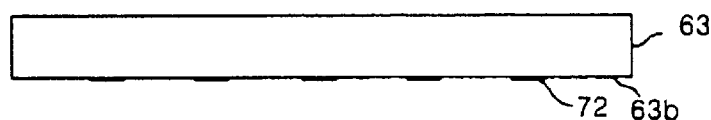
Figure 9D:
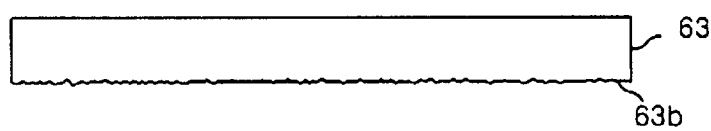

FIG. 9A to FIG. 9D represent various embodiments of the light guide plate 63. The light guide plate 63 can have a wedge shape, the edges of which have a graduated width as shown in FIG. 9A. As shown in FIG. 9B through FIG. 9D, the light guide plate 63 may have minute patterns formed on the output surface 63b. The light guide may be coated with ink having a high refractive index and then be roughly surface-treated.

As shown in FIG. 9B, the number of minute protrusions 71, each of which has a shape of triangle prism, are formed at the output surface 63b of the light guide plate 63. These minute protrusions 71 are not limited to the shape of triangle prism, but may have a trapezoid shape, a half-circle shape or an ellipse shape, etc. The density of the minute protrusions 71 must be set in accordance with the distance between the light guide plate 63 and the reflective liquid crystal display panel 52 so that the light quantity of a light emitted from the output surface 63b is uniform over the entire effective display area of the reflective liquid crystal display panel 52. This density is determined according to the distance from the reflective liquid crystal display panel to the light output surface 63b. More specifically, a density of the minute protrusions 71 is decreased so that the quantity of light emitted when the output surface 63b is close to the lamp 61 is small. The density of the minute protrusions 71 is increased so that the quantity of a light emitted when the output surface 63b is distant from the lamp 61 is relatively large.

As shown in FIG. 9C, ink patterns 72 formed of an ink having a high refractive index are printed on the output surface of the light guide plate 53. The density of the ink patterns 72 also must be set such that the quantity of a light emitted from the output surface 63b is uniform over the entire effective display area of the reflective liquid crystal display panel 52.

As shown in FIG. 9D, the output surface 63b of the light guide plate 63 is roughly surface-treated to have minute scattering portions. By these scattering portions, the quantity of light emitted through the output surface 63b is adjusted.

A power switch of the auxiliary light source 60 is turned "on" when the auxiliary light source 60 is opened from the main body 58. The power switch is turned "off" when the auxiliary light source 60 is snapped and folded against the main body 58. In other words, the power switch can be turned on or off automatically depending on the state of use of the auxiliary light source 60.

As described above, the auxiliary light source of the reflective LCD according to the present invention is configured to open and close from and to the upper portion of the reflective liquid crystal display panel. The open position of the auxiliary light source is beyond the viewing range of an observer. Thus, the auxiliary light source can radiate light as a plane light source onto the display area of the reflective liquid crystal display panel, thereby radiating light uniformly over the entire reflective liquid crystal display panel without impinging the viewing range of the observer. Accordingly, the auxiliary light source is capable of improving the light incidence efficiency, as well as minimizing power consumption. Furthermore, the auxiliary light source is installed above the reflective liquid crystal display panel so that it does not interfere with the display area of the reflective liquid crystal display panel. In addition, the auxiliary light source is snap-folded, to thereby open and close from and to the display module, permitting fabrication of an LCD having light weight and small dimension.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device (LCD), comprising:
   a main body;
   a display module connected to the main body;
   wherein the display module has an top portion, a bottom portion, and side portions; and
   an auxiliary light source, pivotally connected to the top portion of the display module, the auxiliary light source configured to radiate light onto a display area of the display module.

2. The LCD device according to claim 1, wherein the auxiliary light source is configured to be opened and closed from and to the display module.

3. The LCD device according to claim 2, wherein the auxiliary light source is opened from the display module at a certain angle beyond a viewing range of an observer.

4. The LCD device according to claim 1, wherein the auxiliary light source has a width smaller than the display module.

5. The LCD device of claim 1, wherein the auxiliary light source has a length substantially the same as the length of the display module.

6. A liquid crystal display (LCD) device, comprising:
   a lamp;
   a display module;
   a light guide plate having an output surface configured to emit light from the lamp through the output surface;
   a lamp reflector configured to reflect light from the lamp onto an incidence surface of the light guide plate; and
   a cover member enclosing the lamp, the lamp reflector and the light guide plate and engaging the upper portion of the display module with a hinge structure.

7. The LCD device according to claim 6, wherein one surface of the light guide plate is provided with a number of minute protrusions.

8. The LCD device according to claim 7, wherein each of the minute protrusions has a section having a shape selected from one of a triangle, a square, a circle and an ellipse.

9. The LCD device according to claim 7, wherein the minute protrusions are arranged at a differential density on said surface of the light guide plate.

10. The LCD device according to claim 6, wherein one surface of the light guide plate is coated with a material having a high reflective index.

11. The LCD device according to claim 10, wherein the material is arranged at a varying density on said surface of the light guide plate.

12. The LCD device according to claim 1, wherein one surface of the light guide plate is roughly surface-treated.

13. The LCD device according to claim 1, further comprising a reflector configured to surround a rear surface, a side surface, and the output surface of the light guide plate to reflect light emitted through the rear surface and the side surface toward the output surface.

14. The LCD device according to claim 13, further comprising a light path changer for changing an output angle of light so that light emitted through the output surface of the light guide plate is directed to the display area of the display module.

15. The LCD device according to claim 6, further comprising a light path changer for changing an output angle of light so that light emitted through the output surface of the light guide plate is directed to the display area of the display module.

16. The liquid crystal display (LCD) device, comprising:
a main body;
a display module pivotally connected to the main body; and
an auxiliary light source, connected to the display module, the auxiliary light source configured to radiate light onto a display area of the display module, wherein the auxiliary light source has a length substantially the same as the length of the display module.

* * * * *